US008231460B2

(12) United States Patent
Gauselmann

(10) Patent No.: US 8,231,460 B2
(45) Date of Patent: Jul. 31, 2012

(54) ENHANCED PLAY MODE IN A GAMING MACHINE BASED ON CONTRIBUTIONS FROM PLAYER'S WAGERS

(75) Inventor: Michael Gauselmann, Espelkamp (DE)

(73) Assignee: Spielo International Austria GmbH, Lübbecke (DE)

( * ) Notice: Subject to any disclaimer, the term of this patent is extended or adjusted under 35 U.S.C. 154(b) by 553 days.

(21) Appl. No.: 11/622,439

(22) Filed: Jan. 11, 2007

(65) Prior Publication Data

US 2007/0149268 A1 Jun. 28, 2007

Related U.S. Application Data

(63) Continuation-in-part of application No. 11/536,615, filed on Sep. 28, 2006, now abandoned, which is a continuation of application No. 10/277,525, filed on Oct. 21, 2002, now Pat. No. 7,841,935.

(51) Int. Cl.
*A63F 13/00* (2006.01)

(52) U.S. Cl. ................. 463/27; 463/16; 463/20; 463/25

(58) Field of Classification Search .......... 463/6, 16–20, 463/40–42, 1, 25, 27
See application file for complete search history.

(56) References Cited

U.S. PATENT DOCUMENTS 6,098,977 A 8/2000 Sato et al.
6,217,448 B1 4/2001 Olsen
6,224,483 B1 * 5/2001 Mayeroff ........................ 463/20
6,254,483 B1 7/2001 Acres
6,319,125 B1 11/2001 Acres
6,358,149 B1 * 3/2002 Schneider et al. .............. 463/27
(Continued)

FOREIGN PATENT DOCUMENTS

DE 198 55 117 A1 5/2000
(Continued)

OTHER PUBLICATIONS

Fey, Marshall, Slot Machines, A Pictorial History of the First 100 Years, 1994, Liberty Belle Books, p. 162.
European Search Report—3 pages.

*Primary Examiner* — Ronald Laneau
*Assistant Examiner* — Ross Williams
(74) *Attorney, Agent, or Firm* — Patent Law Group LLP; Brian D. Ogonowsky

(57) ABSTRACT

A control unit in communication with a plurality of gaming machines selects one or more of the active machines to be set to an enhanced play mode. The selection may be random or based on other factors. During the enhanced play mode, free games are provided, or the awards attributed to each symbol combination are increased, or additional symbols combinations are deemed winning combinations, or other game parameters may be changed that are advantageous to the player. The wagers by all the players playing machines connected to the progressive jackpot system are used to set the number of free games or the length of the enhanced play mode. The number of free games increases or the length of time of the enhanced play mode increases along with the jackpot that may be won in the enhanced play mode until the values are reset to starting values upon a jackpot win. This technique increases the likelihood that the jackpot will be won in the enhanced play mode as the jackpot progressively increases to optimize the attractiveness of the system to players.

33 Claims, 3 Drawing Sheets

U.S. PATENT DOCUMENTS

| | | | | |
|---|---|---|---|---|
| 6,398,218 | B1 | 6/2002 | Vancura | |
| 6,663,489 | B2 | 12/2003 | Baerlocher | |
| 7,070,501 | B2 * | 7/2006 | Cormack et al. | 463/16 |
| 2001/0036857 | A1 | 11/2001 | Mothwurf et al. | |
| 2002/0094856 | A1 * | 7/2002 | Bennett et al. | 463/16 |
| 2003/0078088 | A1 * | 4/2003 | Schneider | 463/16 |

FOREIGN PATENT DOCUMENTS

| | | | |
|---|---|---|---|
| GB | 2 350 715 | A | 12/2000 |
| WO | 97/49073 | A | 12/1997 |

* cited by examiner

ENHANCED PLAY MODE IN A GAMING MACHINE BASED ON CONTRIBUTIONS FROM PLAYER'S WAGERS

CROSS-REFERENCE TO RELATED APPLICATIONS

This application is a continuation in part of U.S. application Ser. No. 11/536,615, filed on Sep. 28, 2006, entitled Device to Automatically Change Award Parameters for a Gaming Machine, which is a continuation of U.S. application Ser. No. 10/277,525, filed on Oct. 21, 2002, entitled Device to Automatically Change Award Parameters for a Gaming Machine.

FIELD OF INVENTION

The invention is related to gaming devices and, in particular, to changing the game parameters of a game during an enhanced play mode after a triggering event.

BACKGROUND

From the U.S. Pat. No. 6,217,448 B1, a system of linked gaming machines is known that is connected to an external controller and an overhead display. In a special bonus mode time period, the controller randomly determines one or more of the active gaming machines for bonus multiplier opportunities, where an award normally granted by a gaming machine is multiplied by a bonus multiplier. Upon a selected gaming machine obtaining a winning symbol combination, the gaming machine's internal control unit pays out the normal award, and the controller then causes the internal control unit to pay out the multiplied award. The increased payouts are deducted from a bonus pool.

SUMMARY

The gaming device of the present invention increases the attraction for a player by providing an additional feature. The device of the present invention has the advantage that at an unpredicted point in time, which cannot be anticipated by the player, the gaming machine is set to an enhanced play mode. In one embodiment, during the enhanced play mode, the awards attributed to each symbol combination are increased or any other game component may be made more advantageous to the player. The enhanced play mode may exist for a predetermined number of games, a selectable period of time, a variable period of time, or until an award level is reached. In a further embodiment of the present invention, the enhanced play mode grants a certain number of free games, where the enhanced play mode continues for a selected number of free games, a selectable period of time, or until a certain award level is reached. Any enhanced awards need not be provided from a special bonus pool.

During the enhanced play mode, the game itself may change, such as by displaying a different set of symbols, adding new winning combinations, changing the pay loading, or changing the win frequency. By changing the pay loading or win frequency, the machines are operated economically despite the enhanced play mode.

In one embodiment, to ensure that the gaming machine can be operated economically in spite of the enhanced play mode, each gaming machine transmits a signal to an external control unit to show its readiness to participate in the enhanced play mode only if certain parameters are met.

In one embodiment, the enhanced play mode is a number of free games automatically granted to the player for a period of time upon the occurrence of a mystery trigger or a random trigger. In one embodiment, the trigger for initiating the enhanced mode is not directly related to any winning outcome of the base game being played on the gaming machine. The awards won in the free games may be the same as in the base game or increased. The number of free games, or the length of time that the free game period lasts, is based on the wagers made by the active player (or multiple active players), such as from the time a previous player cashed out of the machine or from the time of the last jackpot win. The length of time of the enhanced play mode may also be based on the total awards generated during the enhanced play mode, so that the games remain profitable.

A percentage of the player's wager is used to fund a jackpot. The jackpot may be a community progressive jackpot that any player may win when playing a machine connected to the jackpot system. With each contribution to the jackpot, or after a multiple of contributions, a free game meter on the machine, or on an overhead display, increments to identify how many free games the player(s) has accumulated once the enhanced play mode is started. Instead of a free game meter, the length of time that the enhanced play mode lasts (or other information concerning the enhanced play mode) is conveyed by the meter, and the time is based on the total wagers made by the player.

In one embodiment, the wagers by all the players playing machines connected to the progressive jackpot system are used to set the number of free games or the length of the enhanced play mode for all or selected players connected to the jackpot system. The increasing number of free games or the increasing length of the enhanced play mode may be displayed on an overhead jackpot display to attract new players.

Accordingly, the number of free games and/or the length of time of the enhanced play mode increases along with the jackpot that may be won in the enhanced play mode until the values are reset to starting values upon a jackpot win. The jackpot may be a mystery jackpot which is not known until the time of the win.

This technique of extending the free games or enhanced play mode along with increasing the jackpot has the advantageous effect of increasing the likelihood that a medium jackpot will be won rather than a small or very large jackpot. Thus, the average frequency of winning the jackpot during the enhanced play mode may be optimally set to maximize player participation.

BRIEF DESCRIPTION OF THE DRAWINGS

The present invention is described with reference to the following drawings.

DETAILED DESCRIPTION

Figure 1:
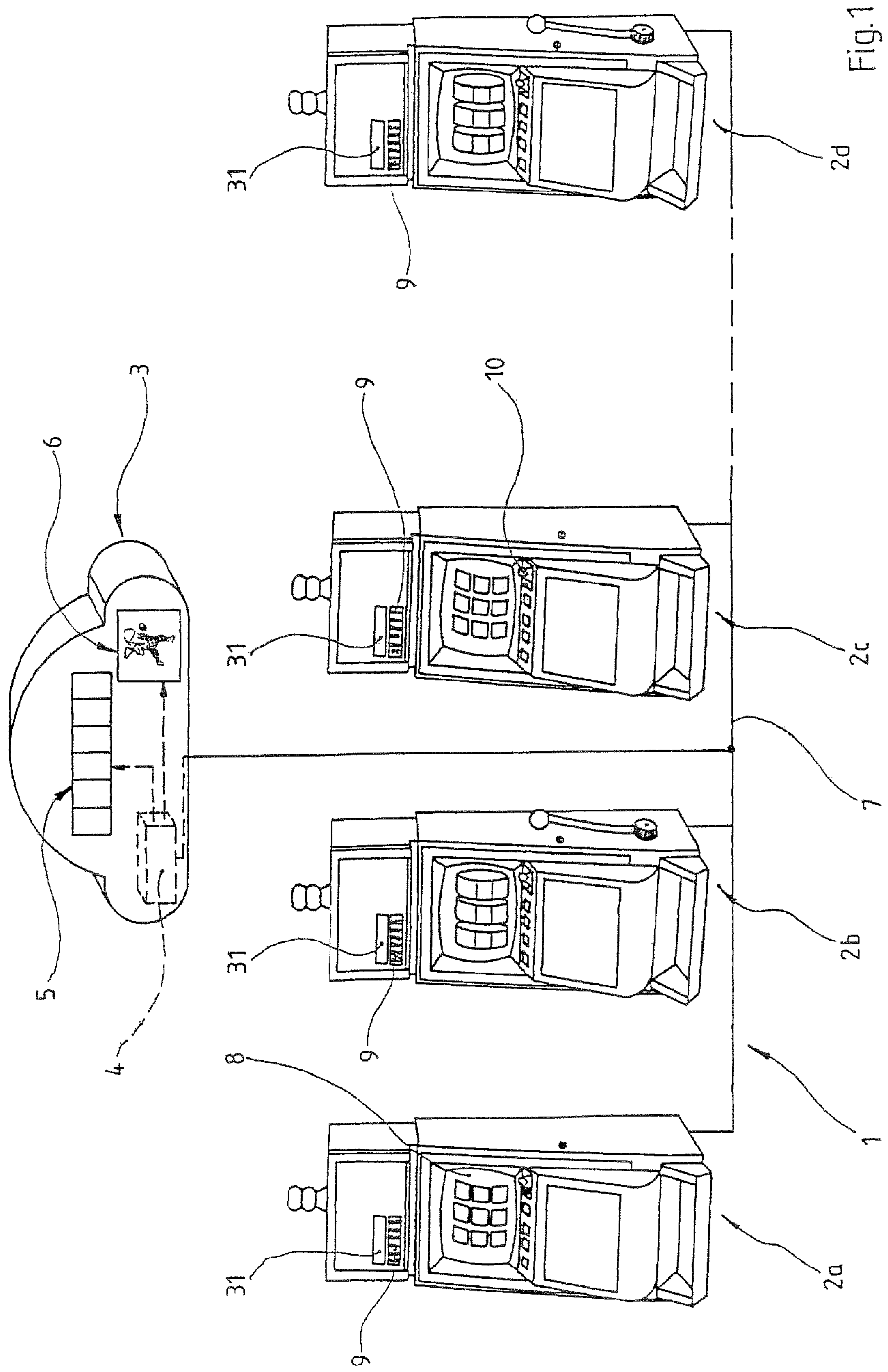
FIG. 1 is a perspective view of a system of gaming machines, a control unit, and a jackpot display.

A system of gaming machines 1 illustrated in FIG. 1 comprises one or more gaming machines 2*a*-2*d* and a jackpot display enclosure 3 housing a separate control unit 4 to control the enhanced play mode, a jackpot display 5 to display a jackpot amount, and an enhanced play mode display 6 to indicate the activation of the enhanced play mode. The gaming machines 2*a*-2*d* are linked within a communication network by wires 7 or by a wireless connection. The gaming machines 2*a*-2*d* within the network can feature different games.

Each gaming machine 2*a*-2*d* comprises its own display 8 to display, for example, pseudo-randomly generated winning or non-winning symbol combinations across one or more pay lines. The display 8 may be a video screen (e.g., a CRT or TFT display) or mechanical reels. A jackpot amount is displayed on the display 5 and on a display 9 of each gaming machine 2*a*-2*d*.

On the front of each gaming machine 2*a*-2*d*, there is a money acceptor 10 (such as for bills, coins, or cards) adjacent to the display 8. The money acceptor 10 is connected to a control unit, comprising a microprocessor, within the gaming machine 2*a*-2*d*.

The control unit 4 in the jackpot display enclosure 3 controls the jackpot display 5 and the enhanced play mode display 6, as well as controlling other aspects of the enhanced play mode. The jackpot display 5 can be a dot-matrix-display, an LCD, a CRT, or any other type of display. The display 6 can be a translucent illuminated display, a CRT, a TFT display, an LCD, or any other type of display. The control unit 4, comprising a microprocessor, in the jackpot display enclosure 3 is connected to the communications network via wires or a wireless (RF or infrared) connection. The control unit 4 may increment the jackpot display 5 based on a percentage of bets or based on any other factors. A jackpot symbol combination by one of the gaming machines 2*a*-2*d* wins all or a portion of the displayed jackpot, and the displayed jackpot amount is decremented.

Figure 2:
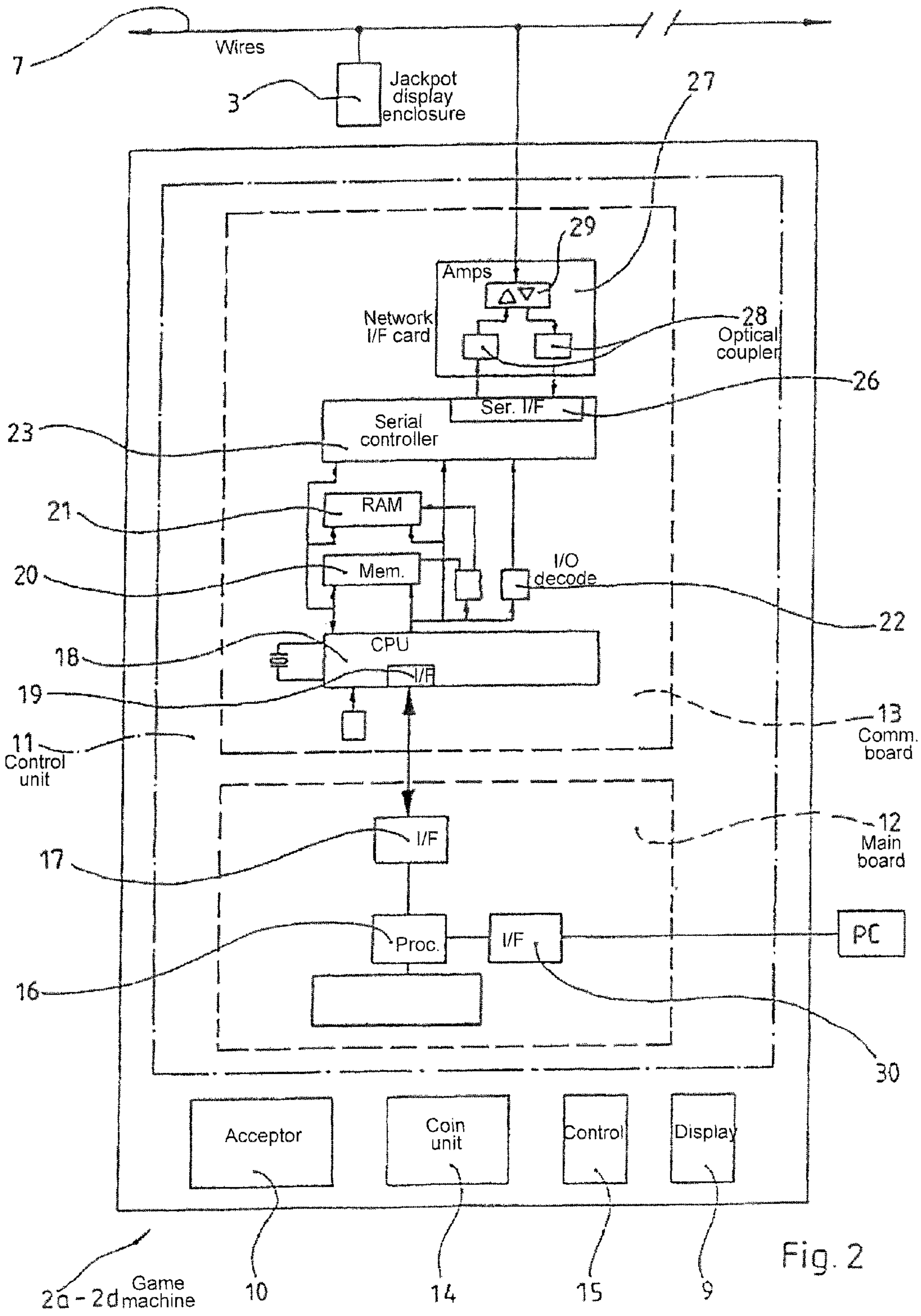
FIG. 2 illustrates the main parts of a gaming machine, including a communication circuit to communicate with the external control unit.

The block diagram of FIG. 2 illustrates functional units used to operate a gaming machine 2*a*-2*d* within the network. The gaming machine 2*a*-2*d* includes a control unit 11. The control unit 11 comprises a main board 12 and a communications board 13. The communications board 13 controls the control unit 4 in the jackpot display enclosure 3 and the data transfer through the network.

A money acceptor 10 forms part of a coin unit 14, such as described in German application DE 364 13 46 A1. The coin unit 14 comprises an electronic coin validator, a hopper and a coin tray. Player control elements 15 are connected to a microcomputer 16 of the main board 12. The microcomputer 16 of the main board 12 comprises a microprocessor with a logic unit, an accumulator battery, a memory, a pulse generator, serial interfaces 17, a BUS system, and an input/output device to control the data transfer with peripheral devices such as the control unit 4, coin unit 14, and control elements 15. The BUS system provides all elements with data and storage addresses and control signals. The serial interface 17 (TTL) establishes a connection with the communications board 13. The serial interface 17 can be RS232 or any other kind of interface.

The communications board 13 comprises a CPU 18 with a serial interface 19. The CPU 18 comprises non-volatile memory 20 and RAM 21. CPU 18, the memory 20, 21, and a serial controller 23 with a serial interface 26 communicate via respective addresses, an I/O-decoder 22, and a BUS system using conventional techniques.

A network interface card 27 is connected to the serial interface 26 (e.g., RS485) of the controller 23. The network interface card 27 comprises an optical coupler 28 for galvanic isolation and an amplifier 29, which is connected to the network via wires 7.

The communication boards 13 of all gaming machines 2*a*-2*d* are connected and communicate to each other. Each communications board 13 has a unique address, which can be set manually. After all gaming machines 2*a*-2*d* are powered up, it is decided automatically which gaming machine 2*a*-2*d* is the master or the slave. All slaves communicate with the master, and the master controls the control unit 4 within the jackpot display enclosure 3 and manages the jackpots. There may be multiple jackpots A and B. In case that there is more than one master after power up, the master with the lowest address becomes a slave.

After a successful master and slave determination upon start up of the gaming machines 2*a*-2*d*, the communications board 13 sends an enable signal to the main board 12. The percentage of each bet in the gaming machines 2*a*-2*d* that is paid to jackpot A and/or B can be configured with a personal computer via an interface 30 (e.g., RS232) on the main board 12. The values of the jackpots A and B are displayed on the display 9 in each gaming machine and on the jackpot display 5 in one or more jackpot display enclosures 3.

After credits are put into the gaming machine 2*a*-2*d*, the control unit 11 for the gaming machine sends a signal, via the master, to the external control unit 4 to indicate to the control unit 4 that the gaming machine is being played and is eligible for the enhanced play mode. Each gaming machine 2*a*-2*d* can be operated with a single bet or an increased bet.

The external control unit 4 determines which of the gaming machines 2*a*-2*d* is activated for the enhanced play mode and controls display 6 to convey that the enhanced play mode is activated. The players of the gaming machines 2*a*-2*d* can see on the display 6 in the jackpot display enclosure 3 that one of the gaming machines 2*a*-2*d* is being chosen for being played in the enhanced play mode. Display 6 may display any icon or animation conveying that the enhanced play mode game machine is being randomly selected, such as by a pseudo-random number generator. The control unit 4 then sends an activation signal, via the master, to the control unit 11 of the selected gaming machine.

The start time of the enhanced play mode may be randomly chosen, based on predetermined times, based on whether the ratio of awards granted versus bets have gone below a certain level, based on games played, or based on other factors.

If there is an activation signal for one of the gaming machines 2*a*-2*d*, the control unit 11 activates a display device 31 (e.g., a backlit sign) on the gaming machine informing the player that the gaming machine will be played in the enhanced mode. Multiple gaming machines may also be selected for the enhanced play mode.

In one embodiment, during the enhanced play mode, any award is automatically increased to a predetermined maximum award for the particular symbol combination obtained by the gaming machine. In another embodiment, all awards are multiplied by for example 2, 3, 4, 5, etc. as selected by the control unit 4. In another embodiment, the player of the selected gaming machine can play for free for a predetermined number of games. For awarding free games, the control unit 11 of the gaming machine 2*a*-2*d* that receives the change-mode signal will lock the debiting of the bets for a predetermined number of games or for a predetermined period of time. Within this period the player can play the gaming machine 2*a*-2*d* without any further bet but obtain awards as if a bet were made.

In a further embodiment of the present invention, a gaming machine 2*a*-2*d* sends a registering signal to the external control unit 4 if the amount of the achieved awards for that machine compared with the bets of the preceding games is smaller than a predetermined threshold value. In response to the signal, the control unit 4 determines that the one or more registered gaming machines 2*a*-2*d* are eligible to be set to the enhanced play mode. The selection may be pseudo-random or based on other factors.

The duration of the enhanced play mode can be determined pseudo-randomly by the control unit 4 in the jackpot display enclosure 3, or the duration can be determined by the number of games played, or the duration can be determined based on whether the awards granted have reached a certain limit, or the duration can be determined based on the total wagers since the last enhanced play mode or since the last jackpot was won. The control unit 11, as commanded by the control unit 4, controls the various parameters of the game to carry out the enhanced play mode.

In one embodiment, as long as a predetermined economical limit is not reached, the gaming machine 2*a*-2*d* can be played in the enhanced play mode. Upon reaching or exceeding the economical limit of the gaming machine 2*a*-2*d*, the enhanced play mode will be stopped by the control unit 4. In one embodiment, the control unit 4 controls the control unit 11 of the selected gaming machine 2*a*-2*d* to change the win frequency and/or pay loading (average payout) of the subsequent games such that the economical limit will be reached within a predetermined number of games. Changing the parameters of the game itself (as opposed to just the awards) may be performed by controlling the control unit 11 to carry out a different software program stored in memory.

In another embodiment, the enhanced play mode may also change the symbols available to the selected gaming machine for forming winning combinations of symbols to add further excitement. Additional winning symbol combinations may also be added during the enhanced play mode.

The jackpot display 5 need not be controlled by the control unit 4 but may be independently controlled by another processor. Display 5 may be used for other purposes or deleted if no progressive jackpot is provided by the system. The control unit 4 may be internal to the jackpot display enclosure 3 or external to it.

The hardware and software configurations of the gaming machines, network, and components in the jackpot display enclosure can be changed while still providing a network that can adequately carry out the invention.

Figure 3:
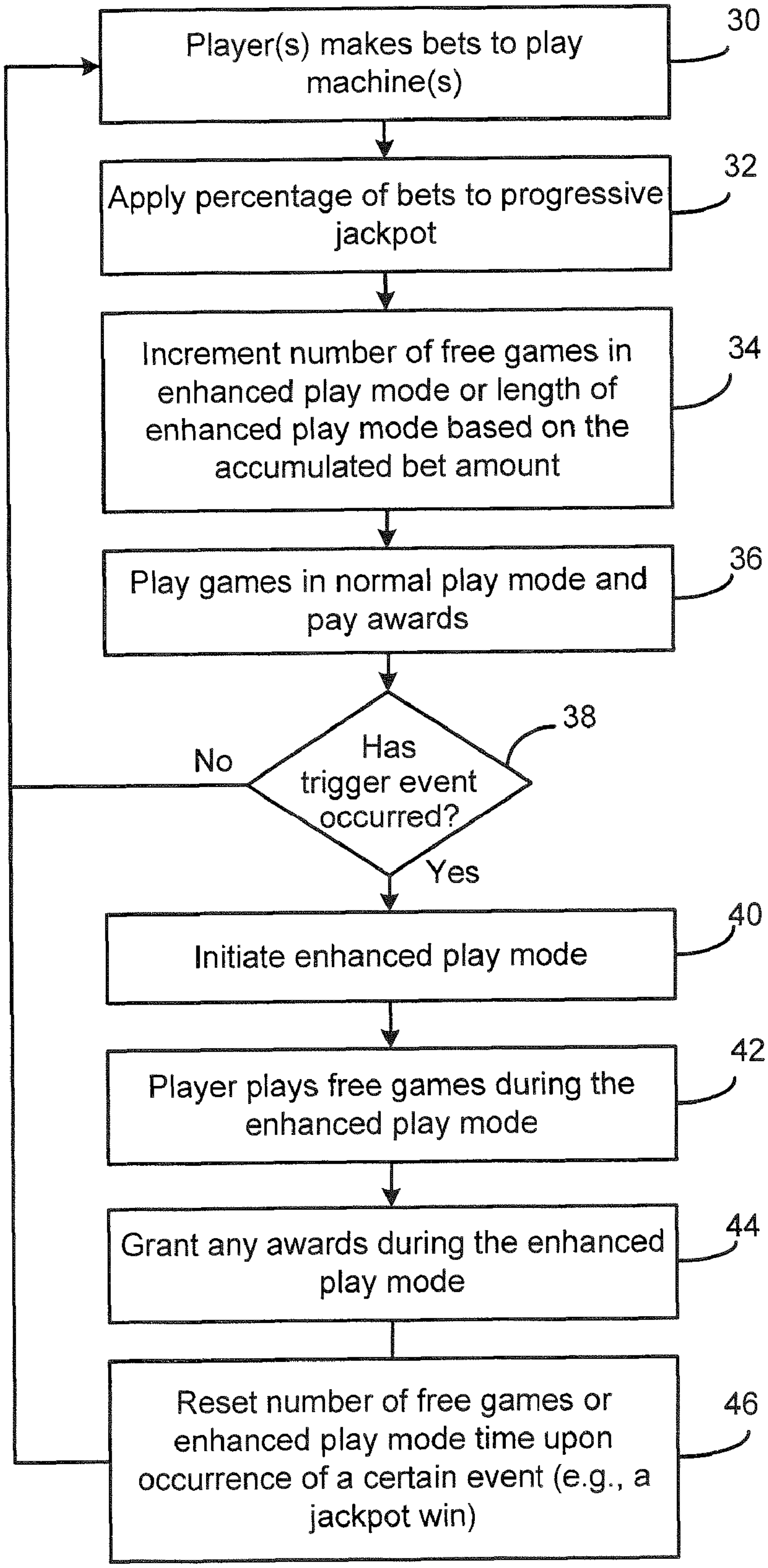
FIG. 3 is a flowchart of a method performed in accordance with one embodiment of the invention where the number of free games in the enhanced play mode and/or the length of the free play mode is dependent on the wagers made.

FIG. 3 is a flowchart showing steps performed in another embodiment of the invention. In the method of FIG. 3, the enhanced play mode is a number of free games automatically granted to a player for a period of time upon the occurrence of an enhanced play mode trigger event, as described above. The awards won in the free games may be the same as in the base game or increased. In a variation of the method of FIG. 3, the enhanced play mode is an increased set of awards, or additional winning symbol combinations, or other enhancement, as previously described.

The embodiment may be applied to a single player or to all players playing on linked gaming machines, such as those shown in FIG. 1.

In step 30, players make wagers to play the base game, which may be a conventional slot machine game with motor driven or virtual reels with symbols. If the gaming machines are part of a linked system with a progressive jackpot, a percentage of the wagers from all players are applied to the progressive jackpot, in step 32. A jackpot is optional.

In step 34, based on the wagers, the system also increases the attractiveness of the enhanced play mode by incrementing the number of free games available during the enhanced play mode or increasing the length of the enhanced play mode (e.g., in one minute intervals). These values may be displayed on the overhead jackpot display enclosure 3 (FIG. 1) to attract players. For example, for every $1000 increase in the jackpot value (based on an accumulated percentage of the wagers since the previous jackpot win), 10 more free games may be added or another minute of enhanced play may be added. If the wagers from all the players connected in the linked system are used to increment the free games or the length of the enhanced play mode, then all players selected to participate in the enhanced play mode receive the same number of free games or benefit from the extended enhanced play mode time. In another embodiment, the number of free games is the total number of free games available to all the players as a group, so the individual players are encouraged to play the free games as fast as possible in order to play more free games than the other participants.

If the number of free games or the length of the enhanced play mode is increased by the wagers, the chances are increased that a player will win the progressive jackpot. In one embodiment, the jackpot may only be won in the enhanced play mode, causing players to play the machines for long times in anticipation of the next enhanced play mode.

The invention of FIG. 3 may also be applied to gaming machines that are not linked, where the total wagers made in a particular gaming machine since a cash-out event determine the number of free games in an enhanced play mode or the length of the enhanced play mode for that particular gaming machine.

The number of free games during the enhanced play mode or the length of the enhanced play mode may be displayed on a meter in an individual gaming machine (e.g., display 9 in FIG. 1) or on an overhead display (e.g., displays 5 or 6 in FIG. 1). The control unit 4 in FIG. 1 may control the incrementing of the free games and/or increasing the enhanced play mode time.

In step 36, the player plays the gaming machine in a normal mode until a trigger event occurs that triggers the enhanced play mode. Various triggers have been discussed above.

In step 38, it is determined whether a trigger event has occurred. If so, in step 40, the enhanced play mode is initiated. All players or only selected players of linked gaming machines, as described above, may participate in the enhanced play mode.

In step 42, the players (or an individual player) participate in the enhanced play mode by playing the free games or benefiting from some other enhancement in the enhanced play mode (e.g., increased award values). In one embodiment, during any free games, the bet amount and activated paylines used in the base game prior to the free games is applied to each of the free games. This encourages players to always play the maximum bet.

In step 44, awards are generated during the enhanced play mode for each of the players until the enhanced play mode is terminated.

In step 46, after the enhanced play mode, the number of free games or the length of the enhanced play mode is optionally reset to a starting value upon a certain event. In one embodiment, the values are only reset if a jackpot is won. In another embodiment, the values are reduced based on the total awards won by the players during the enhanced play mode to keep the gaming system profitable.

In one embodiment, all awards during the enhanced play mode are paid from a jackpot pool, and the number of free games or length of the enhanced play mode is determined by the control unit 4 (FIG. 1) so that, on average, the casino will not lose money from the enhanced play mode. The length of time of the enhanced play mode may be a fixed time limit or based on the total awards generated during the enhanced play mode, so that the games remain profitable. The control unit 4 can optimally control the enhanced play mode and the jackpot so that the jackpot system can completely control the enhanced play mode based on the percentage of wagers allocated to the jackpot system while still achieving profitability in the long run. The invention provides enhanced appeal to the players, resulting in much more game play.

The jackpot may be a displayed value or a mystery jackpot which is not known until the time of the win.

This technique of increasing the number of free games or enhanced play mode along with increasing the jackpot has the advantageous effect of increasing the likelihood that a medium jackpot will be won rather than a small or very large jackpot. Thus, the average frequency of winning the jackpot during the enhanced play mode may be optimally set to maximize player participation.

Any combination of the features described herein may be combined in a game.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A gaming device for use in combination with a network of gaming machines, the gaming machines randomly displaying combinations of symbols, certain symbol combinations being winning combinations providing an award for a player, the gaming machines providing a first set of game rules in a non-enhanced play mode, the device comprising:

a control system in communication with a plurality of gaming machines, the control system incrementing a progressive jackpot based on a percentage of wagers placed on games played by the gaming machines, the control system selecting one or more of the gaming machines for operating in an enhanced play mode for periods of time upon detection of a trigger event, the enhanced play mode causing the selected one or more gaming machines to provide a number of free games to players of the gaming machines, the control system predetermining, prior to the enhanced play mode being initiated, the number of free games to be played in the enhanced play mode or a length of time that the enhanced play mode is in effect, where the number of free games to be played in the enhanced play mode or the length of time that the enhanced play mode is in effect is directly correlated with an amount of accumulated wagers made on a plurality of games by the plurality of gaming machines prior to the enhanced play mode, such that the number of free games to be played in the enhanced play mode or the length of time that the enhanced play mode is in effect increases with the amount of the accumulated wagers, the enhanced play mode automatically terminating after the predetermined number of free games or length of time.

2. The device of claim 1 wherein the trigger event comprises a random event.

3. The device of claim 1 wherein the trigger event occurs at predetermined times.

4. The device of claim 1 wherein the trigger event is based on an outcome of a game played on a gaming machine.

5. The device of claim 1 wherein the trigger event is based on accumulated awards granted over a period of time by gaming machines connected in the network.

6. The device of claim 1 wherein the free games are played using bet amounts made during the non-enhanced mode.

7. The device of claim 1 wherein the control system includes at least one processor external to the gaming machines.

8. The device of claim 1 further comprising a display showing the number of free games to be played in the enhanced play mode or the length of time that the enhanced play mode is in effect, prior to the enhanced play mode being initiated.

9. A gaming system for randomly displaying combinations of symbols to a player, certain symbol combinations being winning combinations providing an award for the player, the gaming system providing a first set of game rules in a non-enhanced play mode, the system comprising:

a control system detecting wagers placed on games played by the gaming system, the control system initiating an enhanced play mode upon detection of a trigger event, wherein game rules in the gaming system are more advantageous for the player than the game rules in the non-enhanced play mode, the control system predetermining, prior to the enhanced play mode being initiated, the number of games to be played in the enhanced play mode or a length of time that the enhanced play mode is in effect, where the number of games to be played in the enhanced play mode or the length of time that the enhanced play mode is in effect is directly correlated with an amount of accumulated wagers made on a plurality of games by a plurality of gaming machines prior to the enhanced play mode, such that the number of games to be played in the enhanced play mode or the length of time that the enhanced play mode is in effect increases with the amount of the accumulated wagers, the enhanced play mode automatically terminating after the predetermined number of games or length of time.

10. The system of claim 9 wherein the enhanced play mode comprises providing the player of the gaming system a number of free games.

11. The system of claim 9 wherein the enhanced play mode comprises providing the player of the gaming system a fixed number of free games.

12. The system of claim 9 wherein the enhanced play mode comprises providing the player of the gaming system free games for a certain time period.

13. The system of claim 9 wherein the gaming system further comprises a plurality of gaming machines connected in a network, and wherein the control system controls a plurality of gaming machines to be in the enhanced play mode simultaneously.

14. The system of claim 9 wherein the trigger event comprises a random event.

15. The system of claim 9 wherein the trigger event occurs at predetermined times.

16. The system of claim 9 wherein the trigger event is based on an outcome of a game played on a gaming machine.

17. The system of claim 9 wherein the trigger event is based on accumulated awards granted over a period of time by gaming machines connected in a network.

18. The system of claim 9 wherein the enhanced play mode comprises increasing award amounts or a likelihood of being granted an award relative to the non-enhanced mode.

19. The system of claim 10 wherein the free games are played using bet amounts made during the non-enhanced mode.

20. A method performed by a gaming system comprising:

providing a first set of game rules in a non-enhanced play mode, the non-enhanced mode comprising a player making a wager before each game, wherein a game comprises randomly displaying combinations of symbols to the player, certain symbol combinations being winning combinations providing an award for the player;

detecting wagers placed on games played by the gaming system;

initiating an enhanced play mode upon detection of a trigger event, wherein game rules in the gaming system are more advantageous for the player than the game rules in the non-enhanced play mode, predetermining, prior to the enhanced play mode being initiated, the number of games to be played in the enhanced play mode or a length of time that the enhanced play mode is in effect, where the number of games to be played in the enhanced play mode or the length of time that the enhanced play mode is in effect is directly correlated with an amount of accumulated wagers made on a plurality of games by a plurality of gaming machines prior to the enhanced play mode, such that the number of games to be played in the enhanced play mode or the length of time that the enhanced play mode is in effect increases with the amount of the accumulated wagers, the enhanced play mode automatically terminating after the predetermined number of games or length of time.

21. The method of claim 20 wherein the enhanced play mode comprises providing the player of the gaming system a number of free games.

22. The method of claim 21 wherein the free games are played using bet amounts made during the non-enhanced mode.

23. The method of claim 20 wherein the enhanced play mode comprises providing the player of the gaming system free games for a certain time period.

24. The method of claim 20 wherein the gaming system further comprises a plurality of gaming machines connected in a network, and wherein the control system controls a plurality of gaming machines to be in the enhanced play mode simultaneously.

25. The method of claim 20 wherein the trigger event comprises a random event.

26. The method of claim 20 wherein the trigger event occurs at predetermined times.

27. The method of claim 20 wherein the trigger event is based on an outcome of a game played on a gaming machine in the gaming system.

28. The method of claim 20 wherein the trigger event is based on accumulated awards granted over a period of time by gaming machines connected in a network.

29. The method of claim 20 wherein the enhanced play mode comprises increasing award amounts or a likelihood of being granted an award relative to the non-enhanced mode.

30. The method of claim 20 further comprising displaying to the player, prior to the enhanced play mode being initiated, the number of games to be played in the enhanced play mode or the length of time that the enhanced play mode is in effect based on the amount of accumulated wagers made on the plurality of games prior to the enhanced play mode.

31. The method of claim 20 further comprising incrementing a progressive jackpot based on a percentage of wagers placed on games played by the gaming system, wherein the number of games to be played in the enhanced play mode or the length of time that the enhanced play mode is in effect is based on a value of the progressive jackpot.

32. The method of claim 20 wherein the number of games to be played in the enhanced play mode by each player varies depending on a frequency of play by that player.

33. The method of claim 20 further comprising incrementing a progressive jackpot based on a percentage of wagers placed on games played by the gaming system, wherein the progressive jackpot can only be won during the enhanced play mode.

* * * * *